US010738926B2

(12) United States Patent
Stieler

(10) Patent No.: US 10,738,926 B2
(45) Date of Patent: Aug. 11, 2020

(54) QUICK CONNECTOR AND METHOD OF USE

(71) Applicant: Cadillac Rubber & Plastics, Inc., Cadillac, MI (US)

(72) Inventor: David C. Stieler, Clay, MI (US)

(73) Assignee: Cadillac Rubber & Plastics, Inc., Cadillac, MI (US)

( * ) Notice: Subject to any disclaimer, the term of this patent is extended or adjusted under 35 U.S.C. 154(b) by 0 days.

(21) Appl. No.: 16/014,144

(22) Filed: Jun. 21, 2018

(65) Prior Publication Data

US 2019/0003626 A1 Jan. 3, 2019

Related U.S. Application Data

(60) Provisional application No. 62/526,508, filed on Jun. 29, 2017.

(51) Int. Cl.
*F16L 37/084* (2006.01)

(52) U.S. Cl.
CPC ....... *F16L 37/0841* (2013.01); *F16L 2201/10* (2013.01)

(58) Field of Classification Search
CPC .................................................. F16L 37/0841
USPC .................................................. 285/308, 93
See application file for complete search history.

(56) References Cited

U.S. PATENT DOCUMENTS

| 5,586,792 | A | 12/1996 | Kalahasthy |
| 5,895,078 | A | 4/1999 | Le Clinche |
| 5,941,577 | A | 8/1999 | Musellec |
| 6,139,214 | A | 10/2000 | Zirps |
| 6,206,435 | B1 | 3/2001 | Le Clinche |
| 6,536,807 | B1 | 3/2003 | Raymond et al. |
| 7,316,425 | B2 | 1/2008 | Poder |
| 7,802,822 | B2 | 9/2010 | Poder et al. |
| 7,845,684 | B2 | 12/2010 | Gaudin |
| 9,677,699 | B2 | 6/2017 | Barthel et al. |
| 2005/0179257 | A1* | 8/2005 | Dick .............. F16L 37/0841 285/305 |
| 2010/0019483 | A1* | 1/2010 | Bokuhn ............... F16L 37/144 285/93 |
| 2010/0052313 | A1* | 3/2010 | Ishida ................. F16L 37/088 285/93 |

FOREIGN PATENT DOCUMENTS

| CN | 1301333 A | 6/2001 |
| CN | 1766397 A | 5/2006 |

(Continued)

OTHER PUBLICATIONS

M Prieto Sanz, European Search Report, dated Oct. 25, 2018, 12 pages, Munich.

(Continued)

*Primary Examiner* — David Bochna
(74) *Attorney, Agent, or Firm* — McGarry Bair PC

(57) ABSTRACT

A quick connector for connecting to a male end of a component includes a housing having a head portion and a body defining a central bore which receives a male end of a component therein. A latch and latch indicator are slidably mounted within the head portion for retaining the male end within the central bore. The latch indicator is offset relative to the latch to provide a visual indication that the component is coupled with the quick connector.

16 Claims, 11 Drawing Sheets

(56) References Cited

FOREIGN PATENT DOCUMENTS

| CN | 104121442 A | 10/2014 |
|----|----|----|
| EP | 0940620 A1 | 9/1999 |
| FR | 2705430 A1 | 11/1994 |
| FR | 2827364 A1 | 1/2003 |
| FR | 2908494 A1 | 5/2008 |
| FR | 2919372 A1 | 1/2009 |
| WO | WO2015121585 A1 | 8/2015 |

OTHER PUBLICATIONS

Quick Connectors, DLH Industries, Inc. 1 page, Item accessed Oct. 27, 2014, www.dlh-inc.com.
Chinese Patent Office, Office Action re Chinese Patent Application No. 201810691021.0; dated Nov. 28, 2019, 8 pages, China.

\* cited by examiner

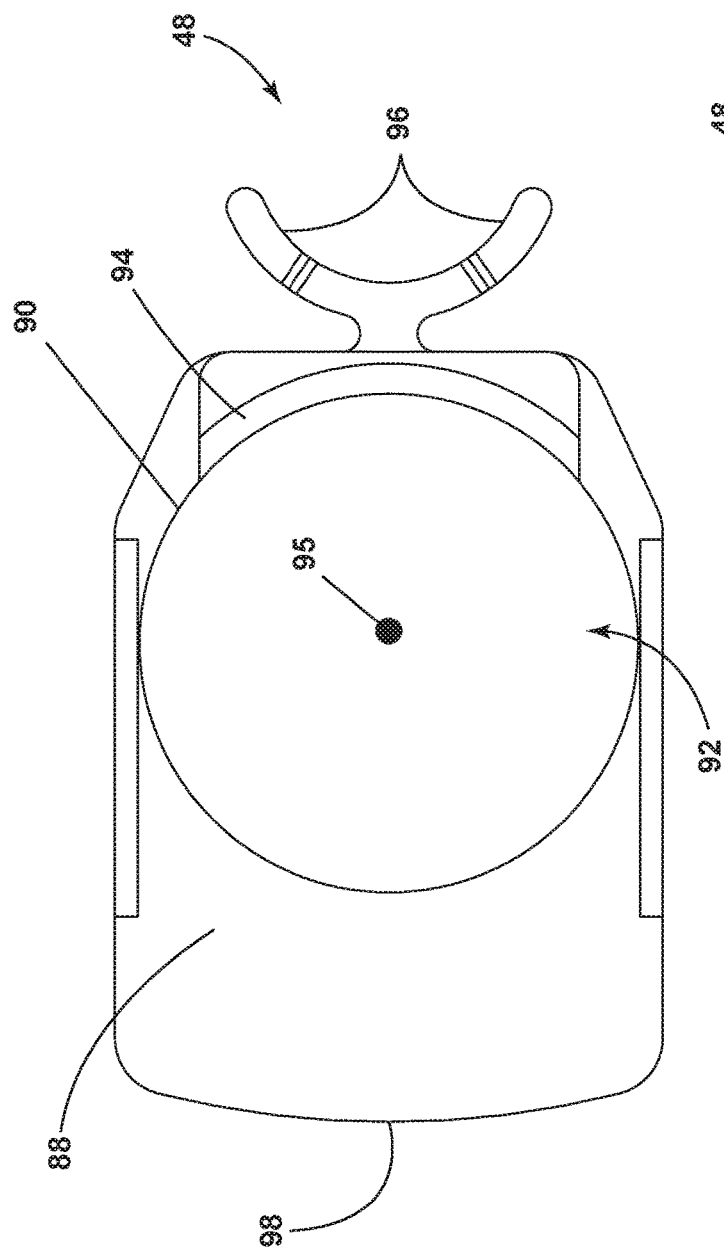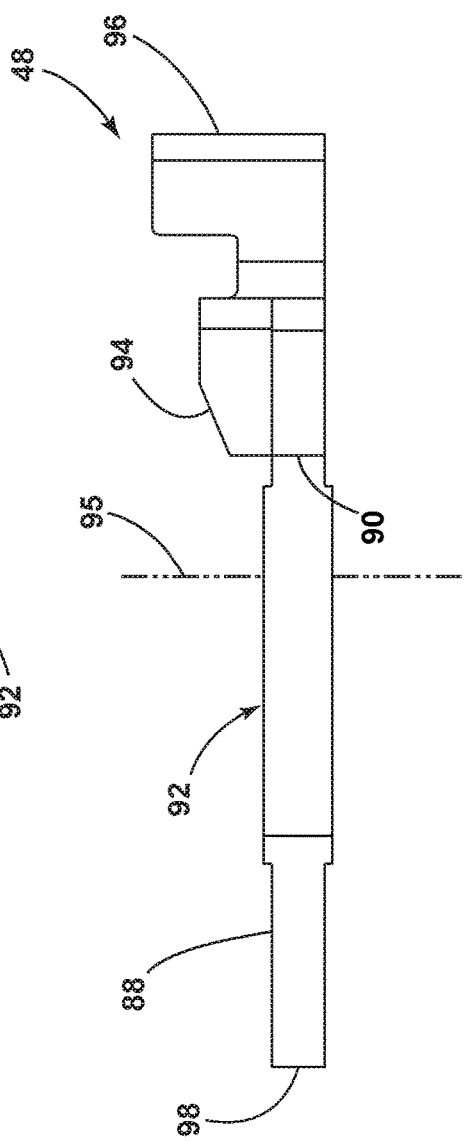
FIG. 6
FIG. 7

QUICK CONNECTOR AND METHOD OF USE

CROSS-REFERENCE TO RELATED APPLICATIONS

This application claims the benefit of U.S. Provisional Patent Application No. 62/526,508, filed Jun. 29, 2017, which is incorporated herein by reference in its entirety.

BACKGROUND

Quick connectors including a male part that is received within a female part are often use to quickly and easily couple components together. In one example, quick connectors are used in the automotive industry to couple fluid circuits together, including pressurized fluid circuits. Traditional quick connectors often include indicators that provide a visual indication that the male part is fully inserted into the female part.

Challenges exist in designing quick connectors that are easy to assemble and disassemble by hand, without the need for specialized tools. Many traditional quick connectors, while intended to be assembled and disassembled by hand, require large forces for assembly and disassembly such that many individuals find it difficult, if not impossible to use quick connectors as intended.

SUMMARY

According to an aspect of the present disclosure, quick connector includes a housing having a head portion and a body defining a central bore configured to receive a first end of a component for releasably coupling the component with the quick connector. The quick connector can include a latch moveable within the head portion between (a) a first position in which the first end of the component is restricted from passing through the latch and (b) a second position in which the first end of the component is allowed to pass through the latch. An actuator can be coupled to the latch for selectively moving the latch between the first and second positions. The actuator can include an actuator face having at least first, second, and third portions, with the third portion disposed between the first and second portions, wherein the third portion of the actuator face is configured to decrease a force required to move the latch between the first and second positions.

BRIEF DESCRIPTION OF THE DRAWINGS

In the drawings:

FIG. 6 is a top-down view of a latch indicator according to an aspect of the present disclosure.

FIG. 7 is a side view of the latch indicator of FIG. 6.

DESCRIPTION

Figure 1:
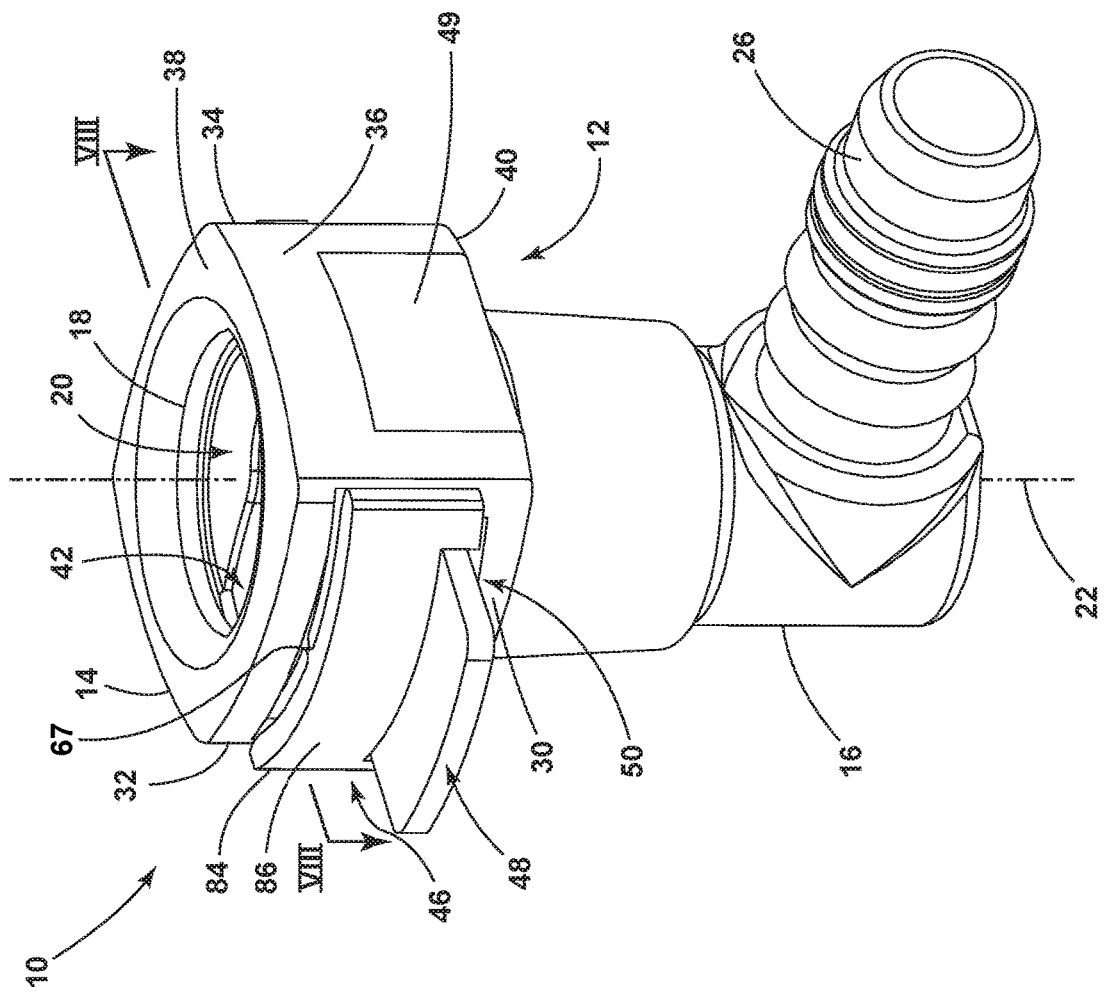
FIG. 1 is a perspective view of a quick connector according to an aspect of the present disclosure.
Figure 2:
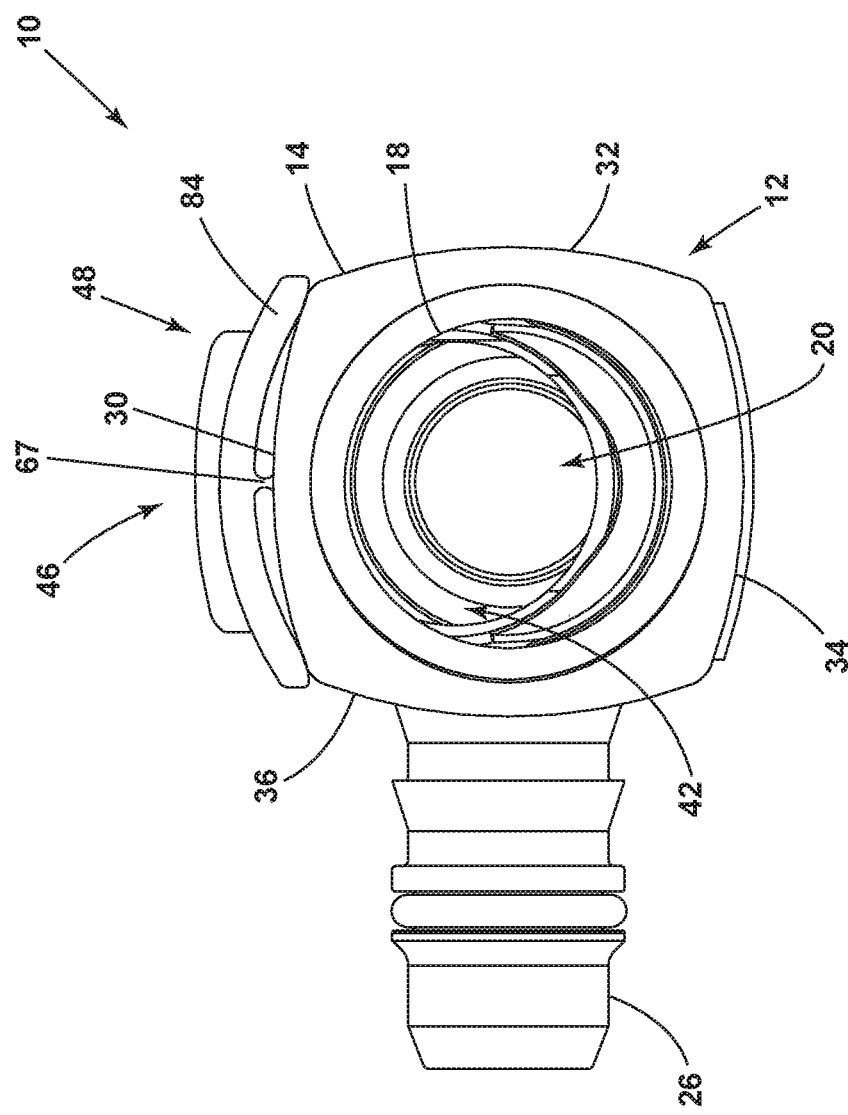
FIG. 2 is a top-down view of the quick connector of FIG. 1.
Figure 3:
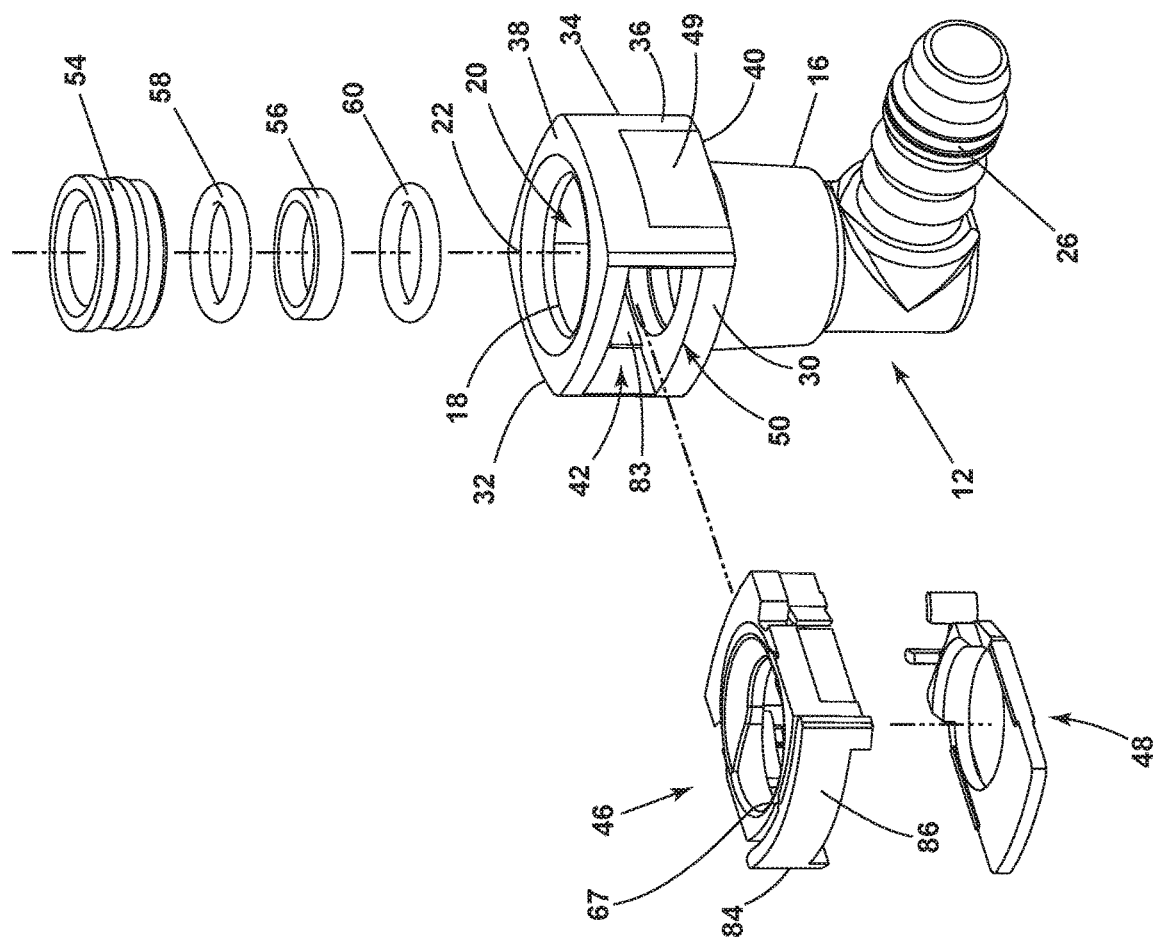
FIG. 3 is an exploded view of the quick connector of FIG. 1.

Referring now to the drawings, and to FIGS. 1-3 in particular, a quick connector is illustrated and generally designated 10. Quick connector 10 includes a housing 12 having a head portion 14 and a body 16. The head portion 14 includes a rim 18 defining an opening to a central bore 20 extending along a central axis 22 of the quick connector 10. The central bore 20 is configured to receive a male part (not shown) therein for coupling to a component.

Referring to FIGS. 1-2, the body 16 optionally includes a connector portion 26 for coupling the quick connector 10 to another component. The connector portion 26 may extend at an angle with respect to the central axis 22 of the quick connector 10, as illustrated, or have a central axis that is generally aligned with the central axis 22 of the quick connector 10. While the quick connector 10 is illustrated as being configured to connect tubing for conducting fluids, non-limiting examples of which include liquids, gases, air, and vapor, it is within the scope of the present disclosure for the quick connector 10 to be used to connect any type of component used to conduct fluid, solid, or gel type material.

The head portion 14 includes first, second, third, and fourth side walls 30, 32, 34, and 36, and upper wall 38 and a bottom wall 40. The side walls 30-36, upper wall 38, and bottom wall 40 together at least partially define a head cavity 42. The upper wall 38 and bottom wall 40 include aligned openings partially defining the central bore 20 and through which the male part is inserted during coupling. The rim 18 is formed in the upper wall 38 and defines an entrance to the central bore 20.

Still referring to FIGS. 1 and 2, the quick connector 10 includes a latch 46 and a latch indicator 48 disposed within the head cavity 42 of the head portion 14. The first side wall 30 includes an aperture 50 through which the latch 46 and latch indicator 48 are visible and accessible when the quick connector 10 is assembled. The second and fourth side walls 32 and 36 optionally include flat portions 49 that facilitate handling during assembly, insertion of a component into the quick connector 10, insertion into mating end-use components, and/or during servicing.

With reference to FIG. 3, the quick connector 10 can include any combination of optional components and optional sealing elements, based on the intended use of the quick connector 10. In the example of FIG. 3, the quick connector 10 includes a seal retainer 54 and a seal spacer 56. A first seal 58, such as an O-ring, is disposed between the seal retainer 54 and the seal spacer 56 and a second seal 60, such as an O-ring, is disposed on a side of the seal spacer 56 opposite the second seal 60. The first and second seals 58, 60 can be configured to provide a fluid seal with the male part coupled with the quick connector 10. One or more optional external seals 62 can be provided on the connector portion 26 of the body 16 for coupling the quick connector 10 with another component. In other examples, a single seal may be used, such as in zero to low pressure applications. In another example, two seals may be used for zero to high pressure applications. The seal spacer 56 is an optional component which may or may not be present. While the quick connector 10 is described as having two seals, it is within the scope of the present disclosure for the quick connector to have more or less seals based on the intended use and desired characteristics of the quick connector.

Figure 4:
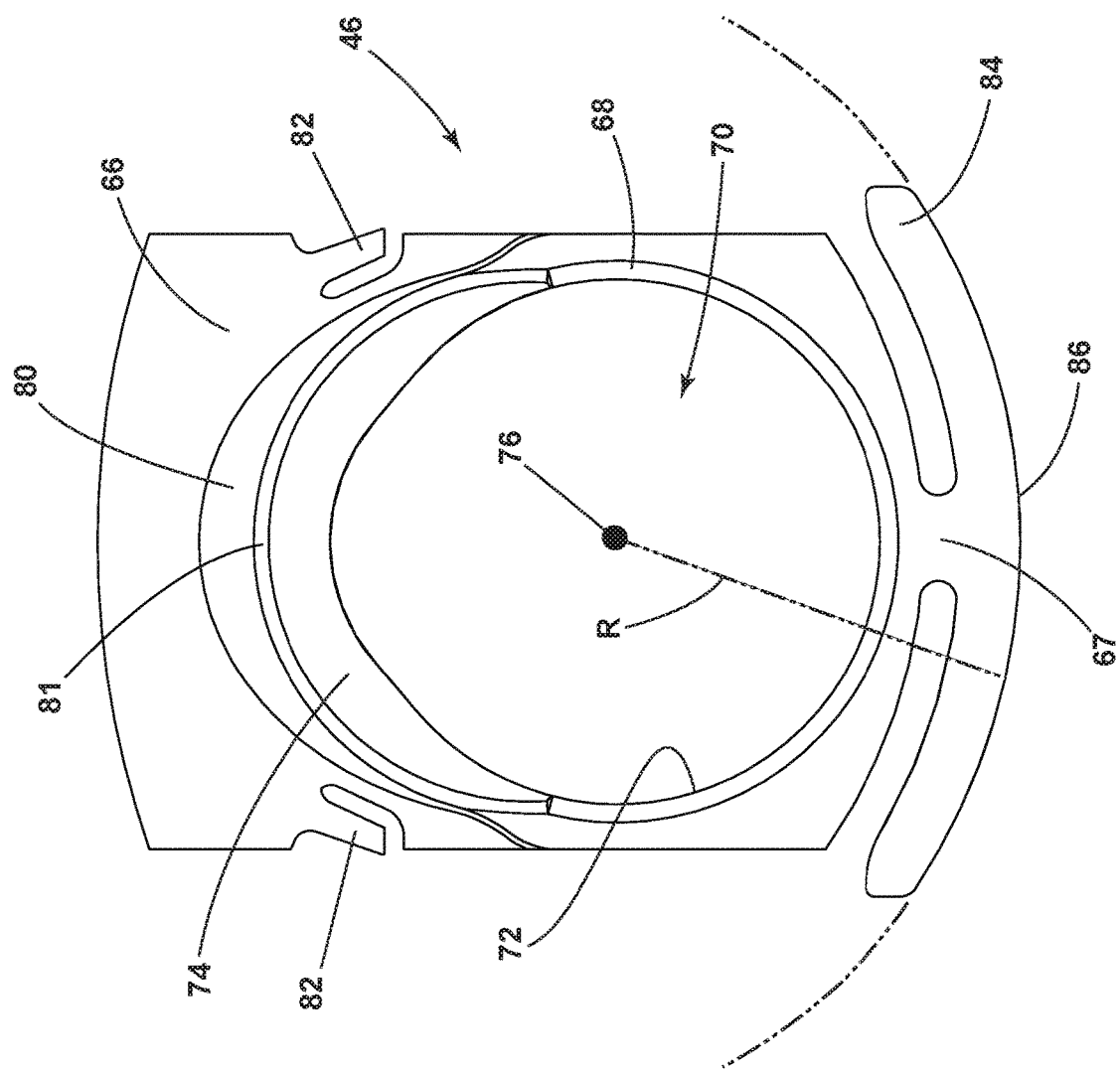
FIG. 4 is a top-down view of a latch according to an aspect of the present disclosure.
Figure 5:
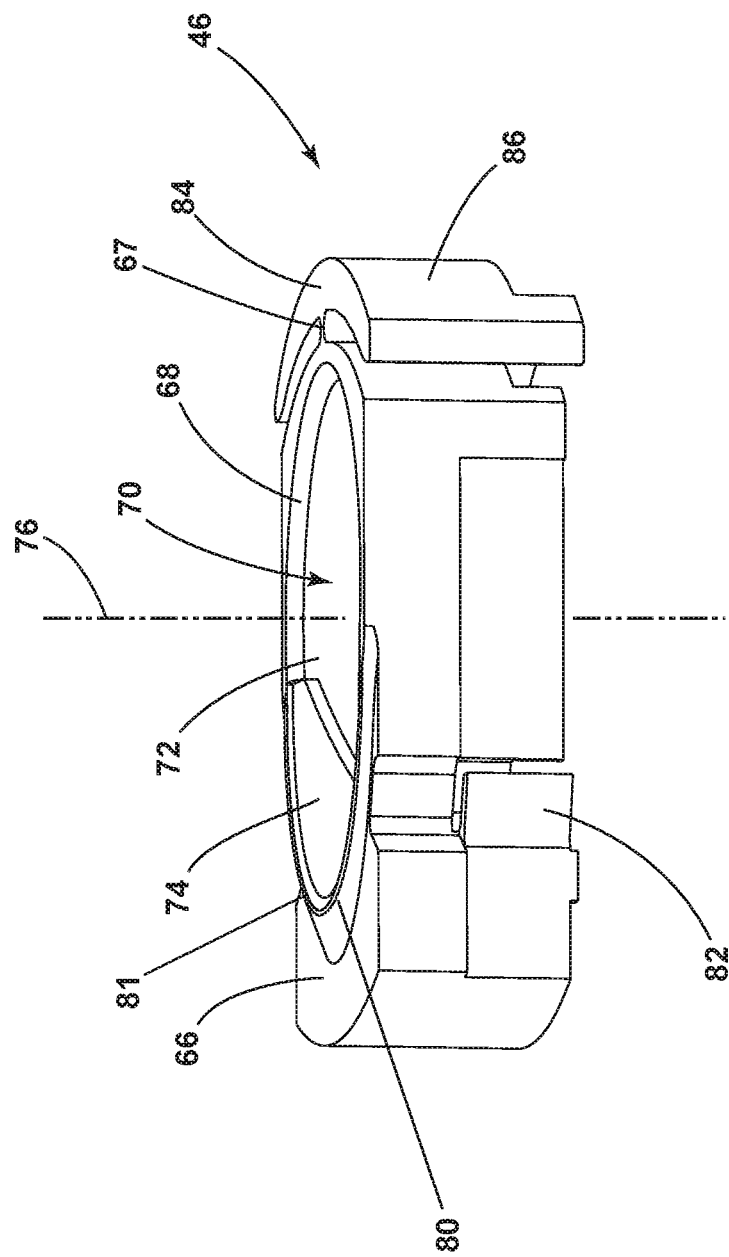
FIG. 5 is a side view of the latch of FIG. 4.

Referring now to FIGS. 4 and 5, the latch 46 includes a latch body 66 including a latch rim 68 defining an opening to a latch bore 70 extending through the latch body 66. The latch bore 70 is configured to allow the male part to be inserted through the latch body 66 during coupling with the quick connector 10. The latch body 66 can include an internal wall 72 defining the latch bore 70. Optionally, at least a portion of the internal wall 72 can include an inner ramp portion 74 that extends from the latch rim 68 toward a central axis 76 of the latch bore 70 at an angle. The angle of the inner ramp portion 74 can be measured with respect to a horizontal axis that is normal to the latch bore central axis 76. The angle of the inner ramp portion 74 can be within a range of 90 degrees to 180 degrees from the horizontal axis and can be consistent throughout the inner ramp portion 74 or optionally vary as the inner ramp portion 74 transitions to the internal wall 72. In one example, the angle of at least a portion of the inner ramp portion 74 is about 135 degrees with respect to the horizontal axis, although other angles between 90 and 180 degrees are contemplated. Portions of the internal wall 72 that do not include the inner ramp portion 74 are generally parallel to the central axis 76 and are at an angle of about 90 degrees with respect to the horizontal axis. In other words, the inner ramp 74 extends upward at an angle as one travels from the internal wall 72 toward the latch rim 68 and an optional outer ramp portion 80.

The latch 46 can include a wall such as outer ramp portion 80 extending from the latch rim 68 toward an upper surface of the latch body 66 at angle, away from the latch bore central axis 22 and the latch central axis 76. The outer ramp portion 80 can extend from the latch rim 68 toward the latch body 66 and intersect the latch body 66 at an acute angle. The angle of the outer ramp portion 80 can be consistent throughout the outer ramp portion 80 or optionally vary as the outer ramp portion 80 transitions to the latch body 66. The latch body 66 can be configured to include one or both of the inner ramp portion 74 and/or the outer ramp portion 80. In other words, one travels downward at an angle from a distal end of the outer ramp portion 80 toward the latch body 66.

The latch body 66 can also include a pair of latch legs 82, each disposed on opposite sides of the latch body 66. The latch legs 82 can be configured to engage a retaining element 83 (FIG. 3) associated with an inner side of the adjacent second and fourth side walls 32, 36 to retain the latch 46 within the head portion 14. The latch body 66 also includes an actuator 84 on a front end that includes an actuator face 86 that is visible through the aperture 50 in the first side wall 30 (FIG. 1). The actuator 84 can be coupled with the latch body 66 by an arm 67. The latch legs 82 can be in the form of resilient legs such that the latch body 66 can be moved relative to the head portion 14 when an appropriate force is applied to the actuator 84 by pressing the actuator face 86 in the direction of the central axis 22 (and the latch bore central axis 76), as described in more detail below. Optionally, only a single latch leg 82 and retaining element 83 may be present.

Referring now to FIGS. 6 and 7, the latch indicator 48 includes an indicator body 88 including an indicator rim 90 defining an opening to an indicator bore 92 extending through the indicator body 88. The indicator bore 92 is configured to allow the male part to be inserted through the indicator body 88 during coupling with the quick connector 10. At least a portion of the indicator rim 90 can be raised relative to the indicator body 88 to form an indicator ramp 94 that defines a sloped surface angled toward a central axis 95 of the indicator bore 92.

The indicator body 88 also includes a pair of indicator legs 96 that are configured to engage the latch 46 to retain the latch indicator 48 within the head portion 14 and adjacent the latch 46. The indicator body 88 also includes an indicator face 98 that is visible through the aperture 50 in the first side wall 30 (FIG. 1). The indicator legs 96 can be in the form of resilient legs such that the latch indicator 48 can be moved relative to the latch 46, and thus also the head portion 14, when an appropriate force is applied to the latch indicator 48. The latch body 66 can include a cavity 97 (FIG. 8) having a shape and size configured to receive and engage the indicator legs 96 therein for retaining the latch indicator 48 with the latch 46 and also to allow the latch indicator 48 to move with latch 46 and relative to the latch 46. As is described in more detail below, the latch indicator 48 may be moved directly by applying a force against the indicator face 98 and/or indirectly by applying a force against the actuator face 86 to move the latch 46 and thus move the indicator 48 by virtue of the engagement of the indicator legs 96 with the latch body 66.

Figure 8:
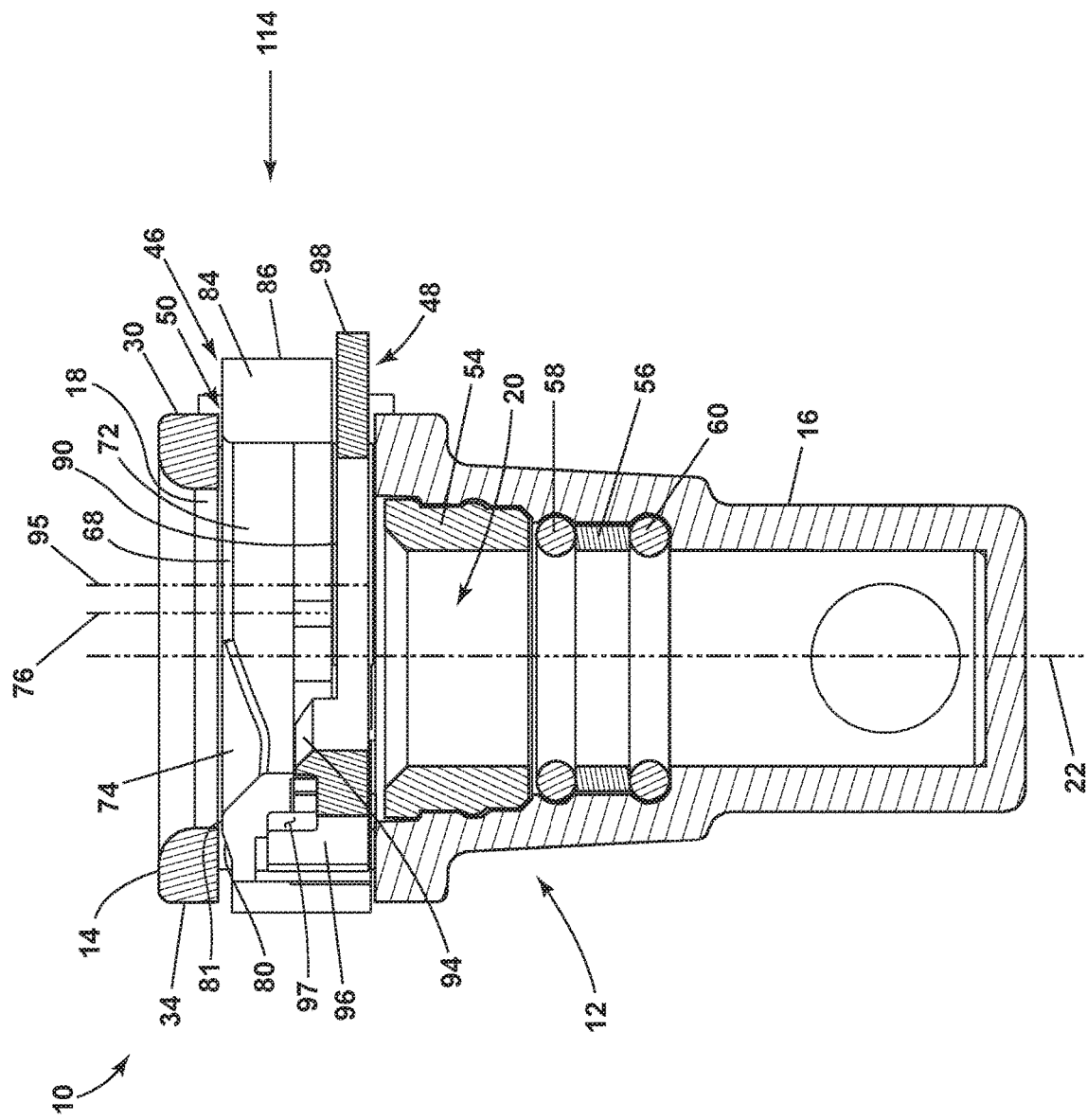
FIG. 8 is a cross-sectional view of a quick connector according to an aspect of the present disclosure.

According to one aspect of the present disclosure, the indicator legs 96 when engaged within the cavity 97 can allow the latch 46 and latch indicator 48 to function as a spring mechanism. The latch 46 and latch indicator 48 can be held together in a pre-installation relationship where the central axes 76 and 95 are offset relative to central axis 22 (FIG. 8). During the insertion of male end 110, the latch 46 and latch indicator 48 are moved such that the respective axes 76 and 95 are temporarily brought in-line with central axis 22. While male end 110 remains inserted, a partial loading is placed on the indicator legs 96. During the removal process of male end 110, a force normal to the central axis 22 can be applied to the actuator face 86 and/or indicator face 98, which applies a compression load to the indicator legs 96. This loading taking place within cavity 97 results in a push back spring load allowing both the latch 46 and the latch indicator 48 to return to the pre-installation position after the male end 110 is removed.

Figure 9:
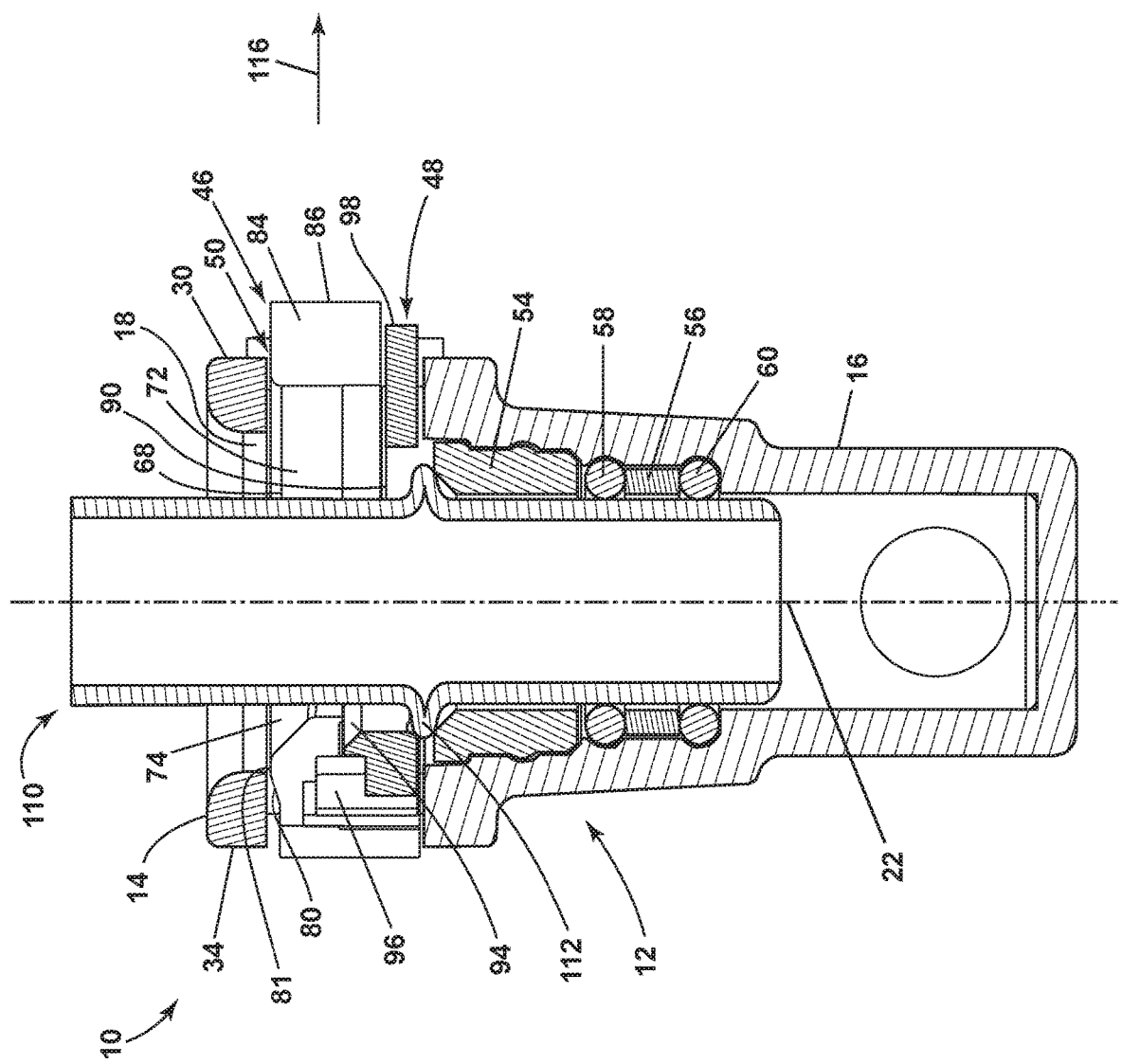
FIG. 9 is a cross-sectional view of a quick connector and a male part fully inserted into the quick connector according to an aspect of the present disclosure.

Referring now to FIGS. 8-9, assembly and use of the quick connector 10 to couple a male end 110 of a component is illustrated. Prior to coupling the male end 110, the quick connector 10 is assembled by installing any of the optional seals and spacers, such as the optional seal retainer 54, seal spacer 56, and first and second seals 58, 60 within the body 16. The latch 46 and latch indicator 48 are assembled and then inserted into the head portion 14 through the aperture 50 in the first side wall 30. As the latch 46 and assembled latch indicator 48 are inserted into the head portion 14, the latch legs 82 flex inward as they pass over the retaining elements 83 extending from the second and fourth side walls 32, 36 and then at least partially return to their resting position once they have passed the retaining elements 83 to engage the retaining elements 83.

In the fully installed, resting position illustrated in FIG. 8, the latch legs 82 engage the retaining elements 83 (FIG. 2) and inhibit withdrawal of the latch 46, and thus also the latch indicator 48, through the aperture 50. The latch legs 82 are configured to bias the latch 46 relative to the head portion 14 such that the latch bore central axis 76 is offset or eccentric with respect to the central axis 22 of central bore 20. The latch indicator 48, by virtue of its engagement with the latch 46, is also biased relative to the head portion 14 such that the indicator bore central axis 95 is offset or eccentric with respect to the central axis 22 of central bore 20. The latch indicator legs 96 are configured to engage the latch 46 and bias the latch indicator 48 relative to the latch 46 such that the indicator ramp 94 is offset closer to the central axis 22 than the latch inner ramp portion 74. In the resting position of FIG. 8, the indicator face 98 extends radially beyond the actuator face 86. The entire indicator face 98 can extend radially beyond the actuator face 86 or only a portion of the indicator face 98 can extend radially beyond the actuator face 86. Optionally, the latch 46 and the latch indicator 48 can be configured such that at least a portion of the indicator face 98 is flush with at least a portion of the actuator face 86 in the resting position of FIG. 8.

Still referring to FIG. 8, to insert the male end 110, a force is applied to the latch 46 and the latch indicator 48, in the direction indicated by arrow 114, to move the latch 46 and the latch indicator 48 relative to the head portion 14 to an insertion or aligned position. In the insertion position, the latch and latch indicator central axes 76 and 95 are generally aligned or coaxial with the central axis 22 of the central bore 20. When the axes 22, 76, and 95 are generally aligned, a bead 112 projecting from the male end 110 can be inserted through the latch 46 and the latch indicator 48 such that the male end 110 can be inserted into its fully installed position within the quick connector 10. The force applied to the latch 46 and the latch indicator 48 during insertion of the male end 110 can be achieved by application of a force to the actuator 84 that is normal to the central axis 95 by pressing on the actuator face 86 and/or by engagement of the male end 110 with the latch 46 and/or latch indicator 48 as the male end 110 is inserted into the central bore 20. Additionally, or alternatively, a force can be applied to the indicator face 98 to move the latch indicator 48 and/or the latch 46 by insertion of the male end 110 and/or by a user of the quick connector.

Referring now to FIG. 9, once the male end 110 is in the fully installed position, the force applied to the latch 46 and the latch indicator 48 is automatically removed or manually removed once pressure applied to the actuator face 86 is removed. Once the force is removed, the latch 46 and the latch indicator 48 move in the direction indicated by arrow 116, into a coupled position in which the latch bore central axis 76 and the latch indicator bore central axis 95 are once again eccentric to the central axis 22. In the coupled position, the latch body 16 and/or the latch indicator body 88 engage the male end 110, either directly or indirectly, to inhibit withdrawal of the male end 110 from the central bore 20. When the latch bore central axis 76 and the latch indicator bore central axis 95 are eccentric to the central axis 22, the opening defined by the latch bore 70 and the indicator bore 92 that is aligned with the central bore 20 has a diameter that is smaller than a diameter of at least the bead 112 to inhibit withdrawal of the male end 110.

When a user is pressing the actuator face 86 to apply pressure to the actuator 84 to move the latch 46 relative to the head portion 14, releasing the actuator 84 removes the force and allows the latch 46 to return to its resting position. If the user is relying only on the insertion force of the male end 110 to displace the latch 46, then the latch 46 will automatically return to its resting position once the bead 112 passes through the latch 46. Optionally, for the latch 46, the resting position may generally be the same as the coupled position.

The latch indicator 48 is configured such that it does not return to its original resting position illustrated in FIG. 8 after the male end 110 is inserted, thus providing a visual indication that the male end 110 is fully inserted and the quick connector 10 and male end 110 are coupled. The indicator legs 96 are configured to engage the latch 46 and bias the latch indicator 48 toward the aperture 50 to a greater extent than the latch 46 such that the latch indicator 48 extends into the central bore 20 to a greater extent than the latch 46 in the resting position. When the male end 110 is inserted into the quick connector 10, the male end 110 presses the latch indicator 48 away from the central axis 22, flexing the indicator legs 96. Because the latch indicator 48 is configured to project into the central bore 20 to a greater extent than the latch 46, the latch indicator 48 does not return to its original resting position when the male end 110 is fully inserted, resulting in the indicator face 98 being offset relative to the actuator face 86 (FIG. 9) in a manner that is visibly distinguishable from the relative positions of the indicator face 98 and the actuator face 86 when the male end 110 is not coupled (FIG. 8).

In one example, the indicator legs 96 and the indicator body 88 are configured such that in the resting position, prior to insertion of the male end 110, at least a portion of the indicator face 98 is flush with at least a portion of the actuator face 86. In this configuration, the indicator legs 96 can be configured such that when the male end 110 is coupled, the latch indicator 48 is offset relative to the latch 46 such that at least a portion of the indicator face 98 is recessed relative to at least a portion of the actuator face 86 to provide a visual indication that the male end 110 is coupled. In another example, such as illustrated in FIGS. 8 and 9, the indicator legs 96 are configured such that in the resting position, prior to insertion of the male end 110, at least a portion of the indicator face 98 extends radially outward, beyond at least a portion of the actuator face 86. In this configuration, the indicator legs 96 can be configured such that when the male end 110 is coupled, the latch indicator 48 is offset relative to the latch 46 such that at least a portion of the indicator face 98 is either flush or recessed (FIG. 9) relative to at least a portion of the actuator face 86 to provide a visual indication that the male end 110 is coupled.

To uncouple the male end 110 from the quick connector 10, a force can be applied to the actuator 84 to move the latch 46 by pressing on the actuator face 86. The force applied to the actuator 84 causes the latch 46 and the latch indicator 48 to move relative to the head portion 14 such that the latch bore and latch bore indicator central axes 76 and 95 are generally aligned with the central axis 22 of the central bore 20. When the central axes 22, 76, and 95 are aligned, the opening defined by the latch bore 70 and the indicator bore 92 has a diameter that is larger than a diameter of the bead 112 to permit withdrawal of the male end 110.

Still referring to FIGS. 8 and 9, coupling and uncoupling of the male end 110 includes movement of the latch 46 relative to the head portion 14, as illustrated by arrows 114 and 116 of FIGS. 8 and 9, respectively. During coupling, the inner ramp portion 74 can facilitate movement of the latch 46 as the male end 110 is inserted to decrease an amount of force required to insert the male end 110. Pressing the actuator 84 also facilitates decreasing the amount of force required to insert the male end 110. The inner ramp portion 74 can extend around a portion of a perimeter of the latch rim 68 or optionally the entire perimeter of the latch rim 68. In the example illustrated in FIGS. 4 and 5, the inner ramp portion 74 extends around about half of the perimeter of the latch rim 68. The inner ramp portion 74 may have any desired height and extend at any desired angle to provide the desired degree of facilitation of insertion of the male end 110.

To uncouple and withdraw the male end 110, pressure is applied to the actuator 84 in the direction 114 of FIG. 8 to align the central axes 22, 76, and 95. However, the process of producing the latch 46 can result in a raised lip or bead present at the latch rim 68 between the inner ramp portion 74 and the adjacent latch body 66. This raised lip can engage or "catch" on the head portion 14 adjacent the inner ramp portion 74 as the latch 46 is being moved in the direction of arrow 114 in FIG. 8 into the position in which the central axes 22, 76, and 95 are aligned to withdraw the male end 110. The engagement between the raised lip and the head portion 14 can undesirably increase the force required to move the latch 46 into the aligned position to uncouple the male end 110. In some cases, the force to move the latch 46 into the aligned position may be too high to realistically achieve by hand by an average user. If the required force is difficult or impossible for a user to readily achieve by hand, the user may attempt to apply force using a tool. Another complicating factor is that access to the quick connector 10 in its end use environment, such as within an automobile, may be obstructed by other components, further increasing the difficulty in applying enough force to move the latch 46 by hand.

In order to address some of the challenges associated with uncoupling the male end 110, the latch 46 can include the outer ramp portion 80 extending adjacent at least a portion of the inner ramp portion 74. The outer ramp portion 80 can be coupled with the inner ramp portion 74 by a planar portion 81 and extends downward from the planar portion 81 toward the latch body 66 to facilitate movement of the latch 46 relative to the head portion 14. Optionally, the outer ramp portion 80 can intersect the inner ramp portion 74 without an intervening planar portion. A height and angle of the outer ramp portion 80 and a width of the planar portion 81 can be selected based on the configuration of the latch 46 and the head portion 14 to decrease the force required to move the latch 46 from the resting position to the aligned position for insertion and withdrawal of the male end 110. The outer ramp portion 80 and the inner ramp portion 74 can extend around the periphery of the latch bore 70 for the same or different distances.

In one example, the outer ramp portion 80 can have a height of about 0.45 inches from the upper end of the inner ramp portion 74 to an upper surface of the latch body 66, although other heights are contemplated. The optional planar portion 81 can have a constant or changing width extending between the outer ramp portion 80 and the inner ramp portion 74. The dimensions of the planar portion 81 can be selected to facilitate movement of the latch 46 relative to the head portion 14. Optionally, the width of the planar portion 81 can be selected to be negligible and correspond to a tolerance required during molding in forming the outer ramp portion 80 and the inner ramp portion 74. While the latch 46 is illustrated as having both the inner ramp portion 74 and the outer ramp portion 80, it is within the scope of the present disclosure for only one of the inner or outer ramp portions 74 or 80 to be included.

Figure 10:
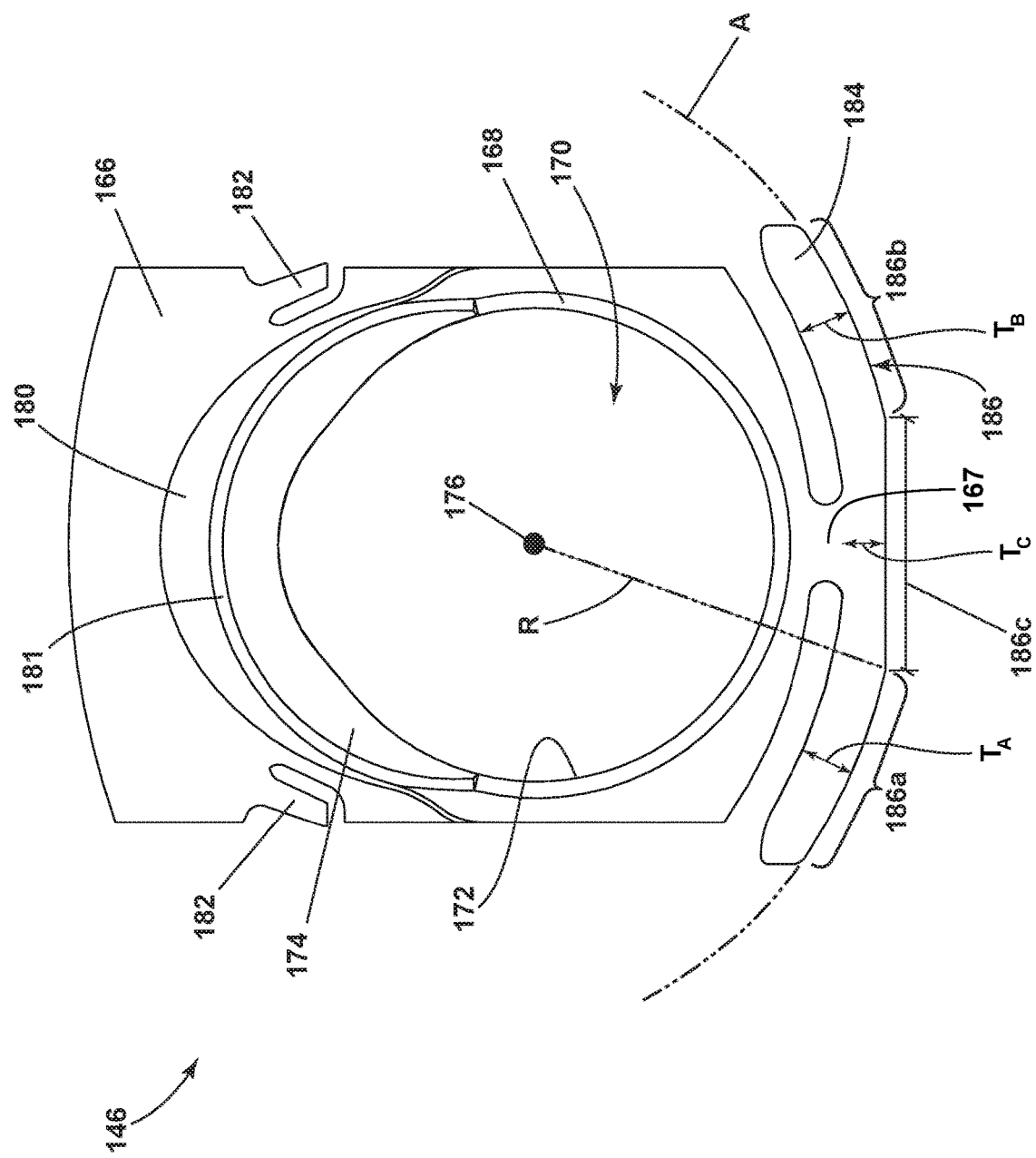
FIG. 10 is a top-down view of a latch according to an aspect of the present disclosure.

Referring now to FIG. 10, a latch 146 according to another aspect of the present disclosure is illustrated. The latch 146 is similar to the latch 46 of FIGS. 4 and 5, with some differences, such as the configuration of the actuator 184. Therefore, elements of the latch 146 that are similar to those of the latch 46 are labeled with the prefix 100. The latch 146 can be used with the quick connector 10 of FIG. 1 in a manner similar to that described above with respect to FIGS. 8 and 9.

The actuator 184 of the latch 146 includes an actuator face 186 that is divided into multiple portions including at least first and second portions 186a and 186b and third portion 186c. The third portion 186c can be in the form of a chord that defines a non-curved, straight line segment extending between the first and second portions 186a, b. The first and second portions 186a, 186b can have a radius of curvature R corresponding to a circular arc A that best approximates the curve corresponding to the first and second portions 186a, 186b.

In one example, the third portion 186c defines a 3 mm straight segment intersecting a 34 mm diameter arc defined by the first and second portions 186a, 186b. Optionally, the third portion 186c defines a 7 mm straight segment. The third portion 186c can be configured to decrease the force required by a user to move the latch 146 relative to the head portion 14. For example, decreasing the third portion 186c from 3 mm to 7 mm decreases the force required by a user to move the latch 146. According to one aspect of the present disclosure, the length of the third portion 186c can be selected to provide the desired decrease in force required for movement of the latch 146.

According to one aspect, the third portion 186c has a decreased thickness $T_C$ compared to a thickness $T_A$ and $T_B$ of the adjacent first and second portions 186a, b, respectively, which may contribute to decreasing the force required to move the latch 146. Increasing the length of the third portion 186c can decrease the amount of material present in the actuator 184 adjacent the connection between the actuator 184 and the body of the latch 146, which may contribute to decreasing the force required to move the latch 146 in use. The shape and relative dimensions of the third portion 186c and the first and second portions 186a, 186b can be selected to provide the desired aesthetic and/or functional features, such as alignment with the shape of a corresponding latch indicator or to facilitate engagement and/or movement of the latch 146.

The latch 146 can be used with the quick connector 10 in a manner similar to that described above for the latch 46. According to an aspect of the present disclosure, the third portion 186c can decrease the force required to move the latch 146 within the head portion 14 for inserting and withdrawing the male end 110. The latch 146 can optionally include the outer ramp 80 of the latch 46 to further facilitate movement of the latch 146 within the head portion 14 during insertion and withdrawal of the male end 110.

Figure 11:
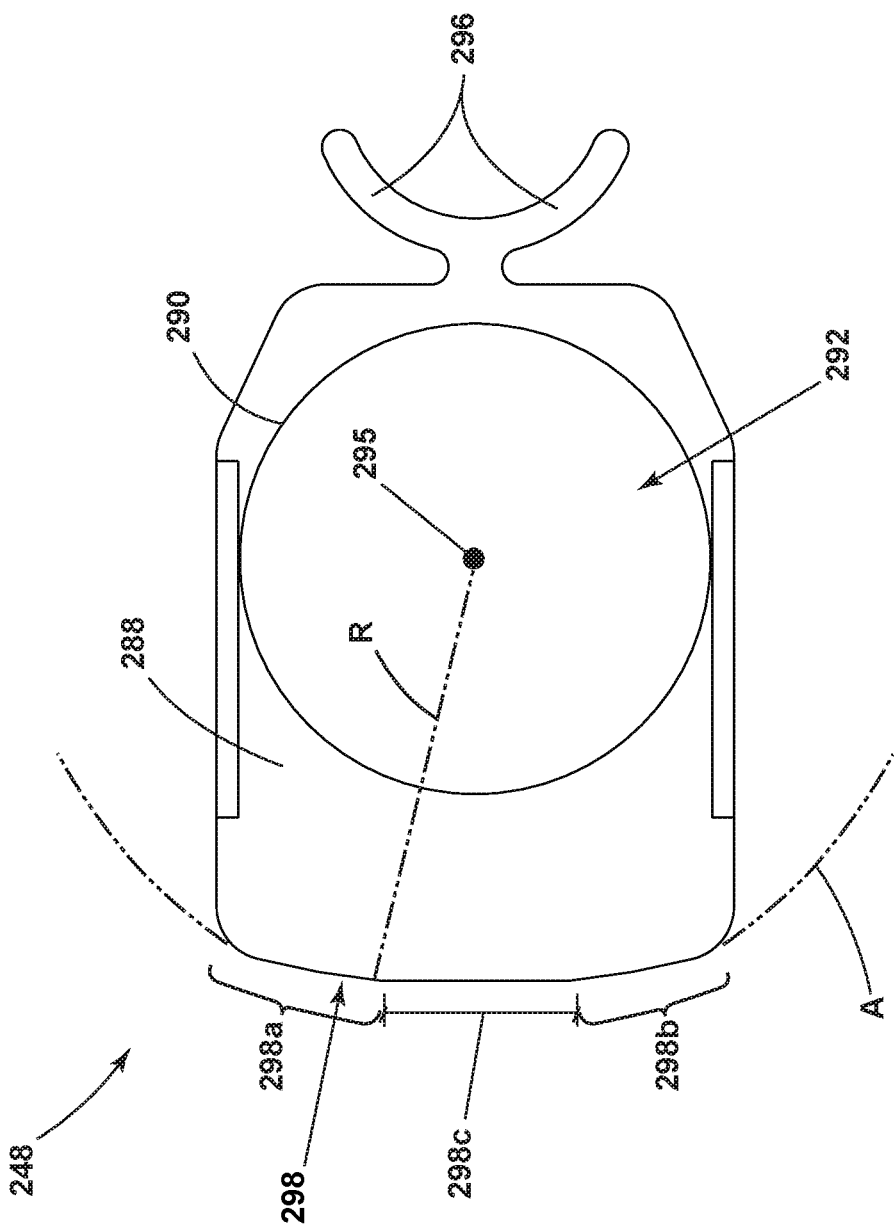
FIG. 11 top-down view of a latch indicator according to an aspect of the present disclosure.

Referring now to FIG. 11, a latch indicator 248 according to another aspect of the present disclosure is illustrated. The latch indicator 248 is similar to the latch indicator 48 of FIGS. 6 and 7, with some differences, such as the configuration of the indicator face 298. Therefore, elements of the latch indicator 248 that are similar to those of the latch indicator 48 are labeled with the prefix 200. The latch indicator 248 can be used with the quick connector 10 of FIG. 1 in a manner similar to that described above with respect to FIGS. 8 and 9.

The indicator face 298 of the latch indicator 248 can be divided into multiple portions including at least first and second portions 298a and 298b and a third portion 298c. The third portion 298c can be in the form of a chord portion that defines a straight a non-curved, straight line segment extending between the first and second portions 298a, b. The first and second portions 298a, b can have a radius of curvature R corresponding to a circular arc A that best approximates the curve defined by the first and second portions 298a, b. In one example, the third portion 298c defines an 8 mm straight segment intersecting a 50 mm diameter arc defined by the first and second portions 298a, b. The relative dimensions of the third portion 298c and the first and second portions 298a, 298b can be selected to provide the desired aesthetic and/or functional features, such as alignment with the shape of a corresponding latch.

The latch indicator 248 can be used with the quick connector 10 in a manner similar to that described above for the latch indicator 48 and can be used with any of the latches of the present disclosure. Applicant has found that the third portion 298c, which has a cross-sectional shape that deviates from the cross-sectional shape defined by the first and second portions 298a, b, can decrease the visibility of the indicator face 298 when the male end 110 is coupled with the quick connector 10. The third portion 298a can have a shape or decreased amount of material compared to the first and second portions 298a, b such that the third portion 298a is even less visible relative to the corresponding latch actuator face than the first and second portions 298a, b. For example, the difference in shape of the third portion 298c provides a greater offset of the third portion 298c with respect to the corresponding latch actuator face than the first and second portions 298a, b.

Decreasing the visibility of the indicator face 298 can facilitate more quickly and easily visually identifying when the male end 110 and quick connector 10 are properly coupled. In one example, the first and second portions 298a, b may be more visible than the third portion 298c such that the first and second portions 298a, b allow a user to recognize that a latch indicator is present while the third portion 298c allows a user to more easily identify that the component is coupled based on the decreased visibility of the third portion 298c. The latch indicator 248 can optionally be used with either the latch 46, 146, or 346. While the latch indicator 248 is described as having only 3 portions, it will be understood that the latch indicator 248 can include additional portions defining additional cross-sectional shapes.

Figure 12:
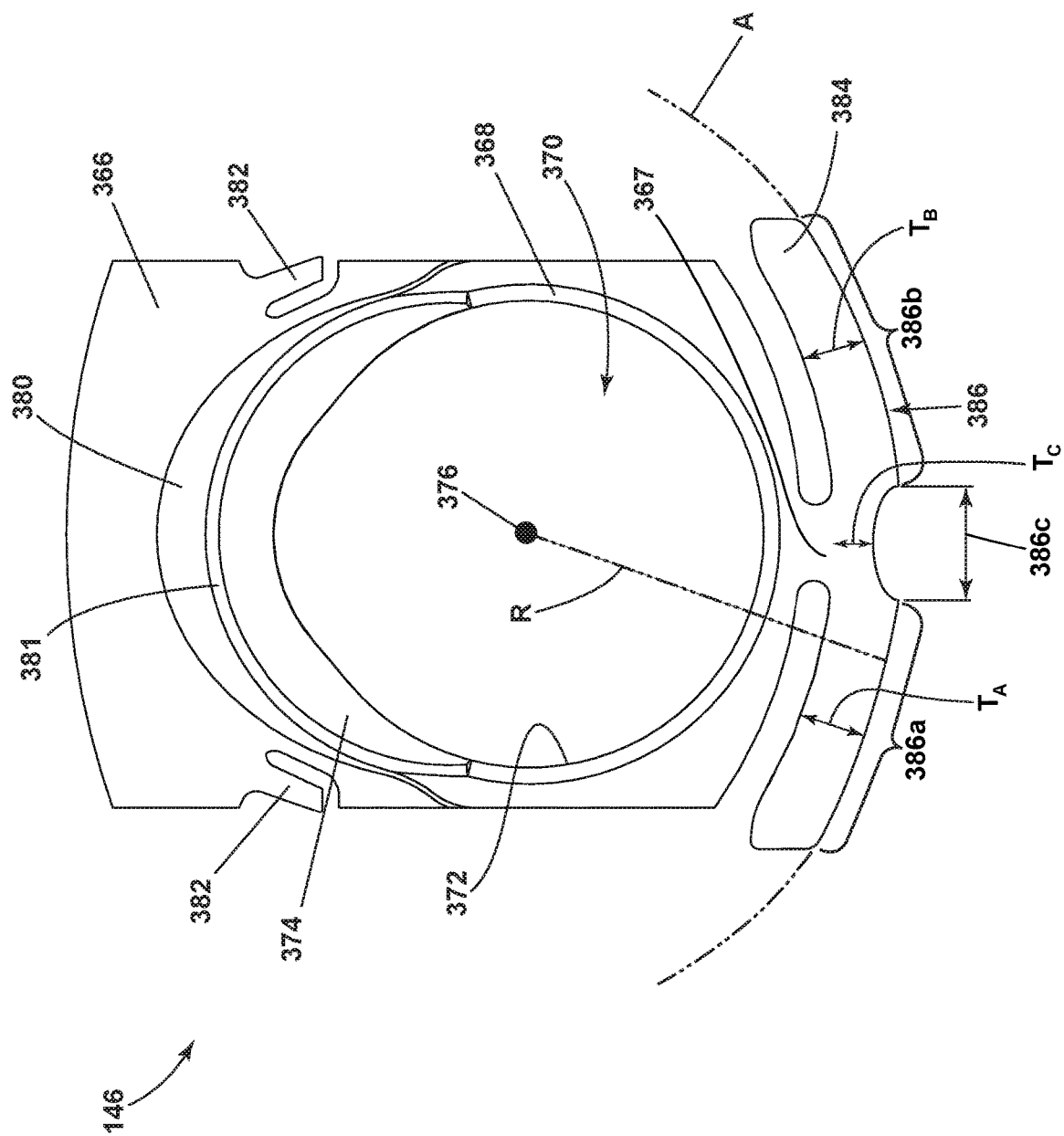
FIG. 12 is a top-down view of a latch according to an aspect of the present disclosure.

FIG. 12 illustrates a latch 346 according to another aspect of the present disclosure. The latch 346 is similar to the latch 46 of FIGS. 4 and 5 and latch 146 of FIG. 10, with some differences, such as the configuration of the actuator 384. Therefore, elements of the latch 346 that are similar to those of the latch 46 and 146 are labeled with the prefix 300. The latch 346 can be used with the quick connector 10 of FIG. 1 in a manner similar to that described above with respect to FIGS. 8 and 9.

The actuator 384 of the latch 346 includes an actuator face 386 that is divided into multiple portions including at least first and second portions 386a and 386b and third portion 386c. The third portion 386c can be in the form of a recessed portion with respect to the first and second portions 386a, b. The first and second portions 186a, b can have an arcuate, convex cross-sectional shape with respect to the latch bore central axis 376. For example, the first and second portions 386a, 386b can have a radius of curvature R corresponding to a circular arc A that best approximates the curve defined by the first and second portions 386a, 386b.

The third portion 386c can include a portion that is recessed with respect to the circular arc A defined by the radius of curvature R of the first and second portions 386a, 386b. The third portion 386c can thus define a concave segment extending at least partially between the first and second portions 386a, b. In one example, the recessed portion 386c defines a concave arc having a diameter of about 3 mm intersecting a 34 mm diameter arc defined by the first and second portions 386a, 386b. The relative dimensions of the recessed third portion 386c and the first and second portions 386a, 386b can be selected to provide the desired aesthetic and/or functional features, such as alignment with the shape of a corresponding latch indicator or to facilitate engagement and/or movement of the latch 346.

The first and second portions 386a, b can have a convex cross-sectional shape with respect to the latch bore central axis 376 while the third portion 386c includes a concave portion, as illustrated in FIG. 12. Optionally, the first and second portions 386a and 386b are in the form of straight line portions and the third portion 386c includes a segment that is recessed with respect to the straight line portions. The recessed portion of the third portion 386c can have a concave cross-sectional shape, as illustrated, or optionally other geometric cross-sectional shapes that are rounded and/or include one or more angles. The entire third portion 386c may be recessed or only a portion of the third portion 386c may be recessed. For example, the third portion 386c can optionally be combined with the chord portion 186c of FIG. 10 such that the third portion is in the form of a chord extending between the first and second portions 386a, b, with the chord being interrupted by a recessed portion. The latch 346 can optionally include the inner and/or outer ramp portions 374 and 380.

According to one aspect, the third portion 386c has a decreased thickness $T_C$ compared to a thickness $T_A$ and $T_B$ of the adjacent first and second portions 386a, b, respectively, which may contribute to decreasing the force required to move the latch 346. The length of the third portion 386c and/or the dimensions of the recessed portion of the third portion 386c can decrease the amount of material present in the actuator 384 adjacent the connection between the actuator 384 and the body of the latch 346, which may contribute to decreasing the force required to move the latch 346 in use. The shape and relative dimensions of the third portion 386c and the first and second portions 386a, 386b can be selected to provide the desired aesthetic and/or functional features, such as alignment with the shape of a corresponding latch indicator or to facilitate engagement and/or movement of the latch 346.

Aspects of the present disclosure address challenges associated with the force required to move the latch 46, 146, 346 described herein to couple with a component and/or release a coupled component. According to one aspect, the cross-sectional shape of the actuator face can be configured to decrease the force required to move the latch relative to the head portion. As discussed above, conventional quick connectors can often be difficult for a user to manipulate without using a tool. In addition, the end use environment of the quick connector can often make it difficult for a user to apply the force required to move the latch.

The latch actuator of the present disclosure can have a cross-sectional shape that is interrupted by a portion that is configured to decrease the force required to move the latch as compared to a similar latch in which the cross-sectional shape is not interrupted. According to an aspect of the present disclosure, the actuator face can include first and second portions that are interrupted by a third portion having a cross-sectional shape that deviates from the cross-sectional shape defined by the first and second portions. While the aspects of the present disclosure are discussed in the context of first, second, and third portions of the actuator face, it is understood that the actuator can include additional portions that may or may not deviate from the cross-sectional shape of the adjacent portions. For example, the actuator face can include fourth and fifth portions, adjacent distal ends of the first and second portions, respectively, which define the same or different cross-sectional shapes compared to the adjacent first and second portions.

Optionally, according to an aspect of the present disclosure, the deviation in the cross-sectional shape of the actuator face corresponds to a decrease in a thickness of the actuator. Decreasing a thickness of the actuator face adjacent the location at which the actuator is coupled to the latch body can decrease the force required to move the latch. According to one aspect, the third portion of the actuator face configured to decrease the force required to move the latch can be disposed adjacent to where the actuator is coupled to the latch body. Optionally, only the third portion of the actuator face is coupled with the latch body such that at least a portion of the remaining portions of the actuator face can flex when force is applied to the third portion to move the latch. The shape and dimensions of the actuator face can be configured to decrease the force required to move the latch relative to the head portion to release a coupled component therefrom or to couple a component therein.

According to another aspect of the present disclosure, the force required to move the latch to couple and/or uncouple a component therefrom can be decreased by including a wall that extends at angle from the latch bore rim to the latch body forming a ramp, such as the outer ramp portion 80, 180, and 380. The angled wall can facilitate movement of the latch within the head portion of the quick connector, thereby decreasing the force required to move the latch. Optionally, a planar portion extends between the angled wall and latch bore rim to further facilitate movement of the latch within the head portion.

According to one aspect of the present disclosure, a combination of the shape and dimensions of the actuator and the angled wall extending between the latch bore rim and the latch body can be utilized to decrease the force required to move the latch within the head portion. Optionally, the inner ramp portion 74, 174, and 374 can be used alone or in combination with the shape and dimensions of the actuator and the angled wall to facilitate coupling and uncoupling the component from the quick connectors described herein.

The following clauses define additional aspects of the present disclosure which are encompassed herein. These aspects can be combined as desired to form combinations that are encompassed by the present disclosure.

A quick connector according to an aspect of the disclosure includes a housing having a head portion and a body defining a central bore configured to receive a first end of a component for releasably coupling the component with the quick connector, with the quick connector further including a latch at least partially disposed within the head portion and comprising a latch bore defined by a rim, wherein the latch is moveable within the head portion between (a) a first position in which the first end of the component is restricted from passing through the latch bore and (b) a second position in which the first end of the component is allowed to pass through the latch bore, a latch indicator at least partially disposed within the head portion and moveable with respect to the latch to indicate when the component is coupled with the quick connector, and an actuator coupled to the latch for selectively moving the latch between the first and second positions, wherein the latch includes a first wall extending from the rim and intersecting the latch body at an angle.

According to an aspect of the present disclosure, the first wall decreases a force required to move the latch from the first position into the second position.

According to an aspect of the present disclosure, the first wall intersects the latch body at an acute angle.

According to one aspect, the first wall extends at least partially around a periphery of the latch bore.

According to another aspect, the first wall includes one of a consistent angle with respect to the latch body or an angle with respect to the latch body that varies around at least a portion of a periphery of the rim.

According to another aspect of the present disclosure, the actuator includes an actuator face having at least first, second, and third portions, with the third portion disposed between the first and second portions, and wherein the third portion of the actuator face is configured to decrease a force required to move the latch between the first and second positions.

According to one aspect, the first and second portions define a first cross-sectional shape and the third portion defines a second cross-sectional shape, different than the first cross-sectional shape. In one aspect, the first cross-sectional shape comprises a radius of curvature. In another aspect, the second cross-sectional shape comprises at least one of a chord portion, a recessed portion, or a combination thereof. In yet another aspect, the first cross-sectional shape comprises a convex radius of curvature with respect to a central axis of the latch bore and the second cross-sectional shape includes at least a portion having a concave radius of curvature with respect to the central axis of the latch bore.

According to another aspect, the first and second portions have a first thickness and the third portion has a second thickness that is less than the first thickness.

According to another aspect, the latch bore is formed in a body of the latch and the actuator is coupled with the body by at least one arm. In one aspect, the at least one arm is coupled with the actuator adjacent the third portion. In one aspect, the first and second portions are configured to flex with respect to the third portion when a force is applied to the third portion to move the latch between the first and second positions.

According to one aspect, the latch indicator includes an indicator face that is one of flush with at least a portion of the actuator face or extends radially beyond the actuator face when the component is uncoupled from the quick connector. In another aspect, at least a portion of the indicator face is recessed with respect to the actuator face when the component is coupled with the quick connector.

According to one aspect of the present disclosure, the latch bore is defined in part by an internal wall and at least a portion of the internal wall extends from rim toward a central axis of the latch bore at an angle.

According to one aspect of the present disclosure the first wall is adjacent to at least a portion of the portion of the internal wall extending at an angle. In another aspect, the latch includes a planar wall connecting a distal end of the first wall with a distal end of adjacent portions of the internal wall extending at an angle.

According to an aspect of the present disclosure, the latch indicator comprises at least one leg that engages the latch such that movement of the latch results in a corresponding movement of the latch indicator. According to one aspect, the at least one leg resiliently engages the latch body such that the latch indicator is movable relative to the latch.

According to one aspect, the latch indicator includes an indicator bore configured to receive the first end of the component and wherein in the first position a central axis of the latch bore and a central axis of the latch indicator bore are eccentric with respect to the central axis of the central bore and in the second position the latch bore, latch indicator, and central bore central axes are coaxial. In one aspect, in the first position, the latch indicator bore central axis is eccentric with respect to the latch bore central axis.

According to one aspect, the actuator is accessible through an aperture in the head portion.

According to an aspect of the present disclosure, a quick connector for connecting to a male end of a component includes: a housing having a head portion and a body defining a central bore aligned along a central axis of the housing, the head portion including a rim defining an opening to the central bore, wherein the bore is configured to receive the male end when the male end is inserted through the opening; and a latch at least partially disposed within the head portion and moveable relative to the head portion through an aperture in the head portion, the latch comprising a latch body including a latch rim defining a latch bore configured to allow the male end to pass through, a pair of legs on opposing sides of the latch body, each of the pair of legs configured to resiliently engage an adjacent side wall of the head portion to retain the latch within the head portion, and a ramp portion extending between the latch rim and the latch body, away from the latch bore, at an angle, wherein the latch is moveable within the head portion between (a) a first position in which the latch bore is coaxial with the central axis and (b) a second position in which the latch bore is eccentric with the central axis, and wherein the ramp portion facilitates movement of the latch relative to the head portion between the first and second positions.

According to an aspect of the present disclosure, a quick connector for connecting to a male end of a component comprises: a housing having a head portion and a body defining a central bore aligned along a central axis of the housing, the head portion including a rim defining an opening to the central bore, wherein the bore is configured to receive the male end when the male end is inserted through the opening, a latch at least partially disposed within the head portion and moveable relative to the head portion through an aperture in the head portion, the latch comprising a latch body including a latch rim defining a latch bore configured to allow the male end to pass through, a pair of latch legs on opposing sides of the latch body, each of the pair of latch legs configured to resiliently engage an adjacent side wall of the head portion to retain the latch within the head portion, and an actuator configured to at least partially project through the aperture in the head portion, the actuator including an actuator face disposed adjacent the aperture, a latch indicator at least partially disposed within the head portion, axially offset from the latch, and moveable with the latch relative to the head portion, the latch indicator comprising an indicator opening configured to allow the male end to pass through, a pair of indicator legs configured to resiliently engage the latch body such that the latch indicator is movable relative to the latch, and an indicator face having first and second portions extending radially with respect to the central axis and defining a radius of curvature of the indicator face and a third portion, disposed between the first and second portions, defining a chord joining the first and second portions, wherein when the male end is inserted into the central bore through the latch bore and the latch indicator opening, the indicator face is offset toward the central axis to a greater degree than the actuator face and wherein the third portion of the indicator face decreases visibility of the indicator face relative to the actuator when the indicator face is offset toward the central axis.

According to another aspect of the disclosure, a quick connector for connecting to a male end of a component comprises a housing having a head portion and a body defining a central bore aligned along a central axis of the housing, the head portion including a rim defining an opening to the central bore, wherein the bore is configured to receive the male end when the male end is inserted through the opening and a latch at least partially disposed within the head portion and moveable relative to the head portion through an aperture in the head portion, the latch comprising a latch body including a latch rim defining a latch bore configured to allow the male end to pass through, a pair of legs on opposing sides of the latch body, each of the pair of legs configured to resiliently engage an adjacent side wall of the head portion to retain the latch within the head portion, and an actuator configured to at least partially project through the aperture in the head portion, the actuator including an actuator face disposed adjacent the aperture, the actuator face having first and second portions extending radially with respect to the central axis and defining a radius of curvature of the actuator face and a chord portion, disposed between the first and second portions, defining a chord joining the first and second portions, and wherein, upon application of a force normal to the central axis, the latch is moveable within the head portion from (a) a first position in which the latch bore is eccentric with the central axis and (b) a second position in which the latch bore is coaxial with the central axis, wherein the third portion of the actuator face decreases the force required to move the latch between the first and second positions.

To the extent not already described, the different features and structures of the various aspects of the present disclosure may be used in combination with each other as desired. That one feature may not be illustrated in all of the aspects is not meant to be construed that it may not be, but is done for brevity of description. Thus, the various features of the different aspects may be mixed and matched as desired to form new aspects, whether or not the new aspects are expressly described. For example, various features of the latch 46, 146, and 346 and the latch indicator 48 and latch indicator 248 can be combined to form new latches and latch indicators and combinations of latches and latch indicators, respectively, not explicitly described, or combined with one another for use with a quick connector without deviated from the scope of the present disclosure.

While the present disclosure has been specifically described in connection with certain specific aspects thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A quick connector including a housing having a head portion and a body defining a central bore having a central bore axis and configured to receive a first end of a component for releasably coupling the component with the quick connector, the quick connector comprising:
   a latch at least partially disposed within the head portion and comprising a latch bore having a latch bore within a body of the latch, wherein the latch is moveable within the head portion between (a) a first position in which the first end of the component is restricted from passing through the latch bore and (b) a second position in which the first end of the component is allowed to pass through the latch bore;

a latch indicator at least partially disposed within the head portion and moveable with respect to the latch to indicate when the component is coupled with the quick connector; and an actuator coupled to the latch for selectively moving the latch between the first and second positions, the actuator including an actuator face having at least first, second, and third portions, with the third portion disposed between the first and second portions;

the first and second portions defining a first cross-sectional shape and the third portion defining a second cross-sectional shape, the first cross-sectional shape including a convex radius of curvature with respect to a central axis of the latch bore and the second cross-sectional shape including at least a portion having a concave radius of curvature with respect to the central axis of the latch bore;

wherein a force applied to the actuator face moves the latch to the second position which enables moving the first end of a component into or out of the central bore, and removal of a force on the actuator face moves the latch to the first position which restricts moving the first end of a component into or out of the central bore, and wherein the latch indicator moves to indicate when the first end of a component is received in the central bore.

2. The quick connector of claim 1 wherein the first and second portions have a first thickness and the third portion has a second thickness that is less than the first thickness.

3. The quick connector of claim 1 wherein the latch indicator includes an indicator face that is one of flush with at least a portion of the actuator face or extends radially beyond the actuator face when the component is uncoupled from the quick connector.

4. The quick connector of claim 3 wherein at least a portion of the indicator face is recessed with respect to the actuator face when the component is coupled with the quick connector.

5. The quick connector of claim 1 wherein the latch includes a first wall extending from a rim of the latch bore, away from a central axis of the latch bore, and intersecting the latch body at an angle.

6. The quick connector of claim 1 wherein the latch bore is defined at least in part by an internal wall and the internal wall includes an angled portion extending from a rim of the latch bore toward a central axis of the latch bore at an angle.

7. The quick connector of claim 1 wherein:
the latch includes a first wall extending from a rim of the latch bore, away from the latch bore axis, and intersecting the latch body at an angle.

8. The quick connector of claim 7 wherein at least a portion of the first wall is adjacent to the angled portion of the internal wall.

9. The quick connector of claim 8, further comprising a planar wall connecting a distal end of the first wall with an adjacent end of the angled portion of the internal wall.

10. The quick connector of claim 1 wherein the latch indicator comprises at least one leg that engages the latch such that movement of the latch results in a corresponding movement of the latch indicator.

11. The quick connector of claim 10 wherein the at least one leg resiliently engages the latch body such that the latch indicator is movable relative to the latch.

12. The quick connector of claim 1 wherein the latch indicator includes an indicator bore having an indicator bore axis and configured to receive the first end of the component and wherein in the first position the latch bore axis and the indicator bore axis are eccentric with respect to the central axis of the central bore and in the second position the latch bore, latch indicator, and central bore axes are coaxial.

13. The quick connector of claim 12 wherein in the first position, the latch indicator bore central axis is eccentric with respect to the latch bore central axis.

14. The quick connector of claim 1 wherein the actuator is coupled with the latch body by at least one arm.

15. The quick connector of claim 14 wherein the at least one arm is coupled with the actuator adjacent the third portion.

16. The quick connector of claim 15 wherein the first and second portions are configured to flex with respect to the third portion when a force is applied to the third portion to move the latch between the first and second positions.

* * * * *